Aug. 27, 1957   R. C. McSHIRLEY   2,803,840
MACHINE TOOL HAVING AN OSCILLATABLE TOOL SPINDLE AND
PLURAL WORK HOLDERS MOVABLE IN A CIRCULAR PATH
Filed Feb. 8, 1954   7 Sheets-Sheet 3

Inventor:
Robert C. McShirley
By Harold J. DeVesconte
Atty.

Aug. 27, 1957   R. C. McSHIRLEY   2,803,840
MACHINE TOOL HAVING AN OSCILLATABLE TOOL SPINDLE AND
PLURAL WORK HOLDERS MOVABLE IN A CIRCULAR PATH
Filed Feb. 8, 1954   7 Sheets-Sheet 5

Inventor:
Robert C. McShirley.

Aug. 27, 1957           R. C. McSHIRLEY           2,803,840
MACHINE TOOL HAVING AN OSCILLATABLE TOOL SPINDLE AND
PLURAL WORK HOLDERS MOVABLE IN A CIRCULAR PATH
Filed Feb. 8, 1954                                       7 Sheets-Sheet 7

United States Patent Office 2,803,840
Patented Aug. 27, 1957

2,803,840

MACHINE TOOL HAVING AN OSCILLATABLE TOOL SPINDLE AND PLURAL WORK HOLDERS MOVABLE IN A CIRCULAR PATH

Robert C. McShirley, Glendale, Calif.

Application February 8, 1954, Serial No. 408,850

22 Claims. (Cl. 10—130)

This invention relates to machine tools and more particularly to improvements in that general type of machine tools in which the work pieces are manually fed into the machine while it is operating and in which the machining operations are thereafter performed automatically. In general, such machines heretofore have included a rotatable turret having a plurality of work holding stations and in which the turret is indexed in a progression of predetermined time intervals past the various tools until the cycle is completed.

In the present invention the machine is so constructed and organized that a multiple station work holding means is constantly rotated at infinitely variable speeds and with the tools moving with the work holding means until the machining operation is complete, at which time the tools return to their starting position to meet the next advancing work station. Under these conditions, where the machining time is short, the speed or rotation of the work holding means can be increased with resultant reduction of the elapsed time between successive repeat operations and variation of the rate of production of the machine to achieve the greatest possible efficiency for the operations for which the machine is set up.

Accordingly, the primary object of the machine is to provide a semi-automatic, chucking type of machine tool which is so constructed and arranged as to permit variation in the time required for a cycle of operation proportional to the time required for a machining operation on the machine.

Another object of the invention is to provide a semi-automatic machine tool for chucking operations characterized by the use of a constantly rotating, multiple station work holding means and coaxially disposed oscillating tool carrying means provided with means interengaging the work holding means for movement therewith during a machining operation and then upon release from such engagement returning to meet the next advancing work holding station.

Another object of the invention is to provide a semi-automatic machine tool constructed and arranged to permit the simultaneous engagement of the work by a plurality of tool elements at each of a plurality of work stations with the movement of one of said tool elements being effective to control the movements of all of the other tool elements.

With the foregoing objects in view, together with such additional objects and advantages as may subsequently appear, the invention resides in the parts, and in the construction, combination and arrangement of parts described by way of example in the following specification of certain modes of execution of the invention and illustrated in the accompanying drawings forming a part of said specification and in which drawings:

Figs. 16, 17, 18 and 19 relate to a modification of the feed means for the machining elements and of which:

Referring first to Figs. 1 through 15 and 20, the illustrated embodiment of the invention comprises a frame 1 including a generally rectangular platform 2 and a pair of upstanding bearing members 3 and 4 disposed one at each end of said platform and carrying aligned bearings 5 and 6 providing journal support for a shaft 7 extending between said bearings above the platform. Mounted on the platform adjacent the member 3 is a motor 8 operatively connected by a shaft 9 to a fixed ratio speed reducer 10 which, in turn, is connected by a shaft 11 with a manually variable ratio speed reduction unit 12 having a power output sprocket 13 connected by a chain 14 to a sprocket 15 mounted in fixed relation with respect to the shaft 7. By means of the adjusting lever 16 on the unit 12 the rate of rotation of the shaft 7 and of the elements fixed thereto can be varied.

Figures 4, 5, 6:
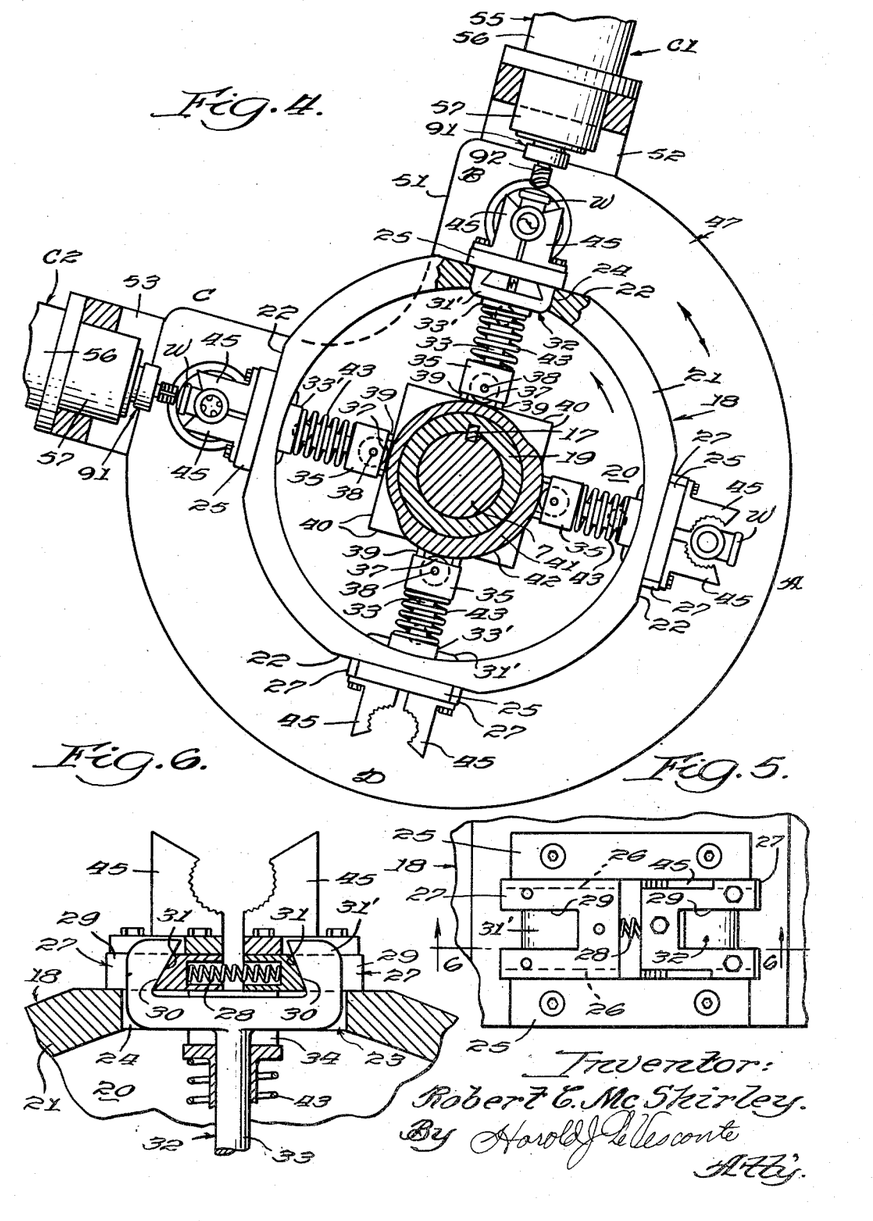
Fig. 4 is an enlarged, fragmentary transverse section taken on the line 4—4 of Fig. 1 and showing the work holding and releasing means and the means for the actuation thereof.
Fig. 5 is an enlarged plan view of one of the work holding devices, one of the work engaging jaws being omitted.
Fig. 6 is a sectional side elevation taken on the line 6—6 of Fig. 5.
Figures 7, 8:
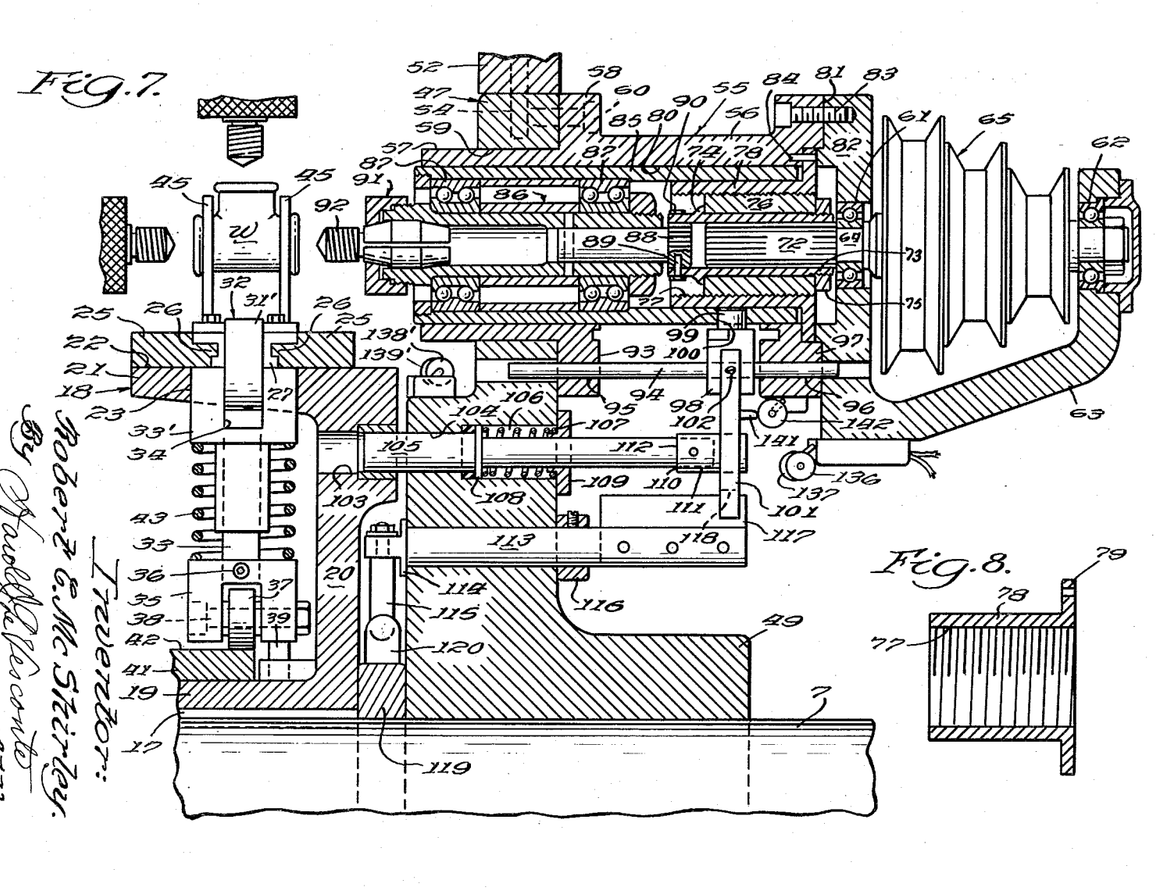
Fig. 7 is an enlarged, longitudinal, medial, sectional view of the machining unit, hereinafter referred to as the master unit, and of the indexing means and other control means associated therewith; the figure being taken on the line 7—7 of Fig. 3.
Fig. 8 is a longitudinal, medial sectional view of the tool feeding sleeve element used in the form of the invention shown in Figs. 1 through 15.
Figures 9, 10:
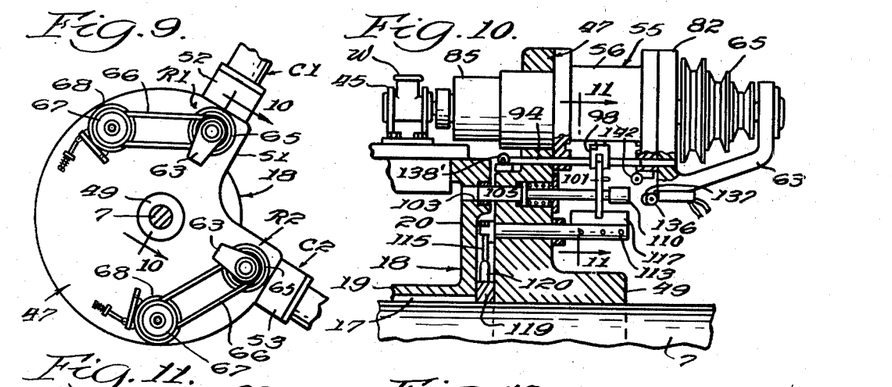
Fig. 9 is a reduced scale view similar to Fig. 3 but showing a representative position of the machining units at the time of completion of a machining operation and before the unit is reversely oscillated for the next operation.
Fig. 10 is an enlarged sectional view of the indexing means at the time of completion of a machining operation and before retraction of the tool; the section being taken on the line 10—10 of Fig. 9.

Fixed to the shaft 7 about at its mid length by a key 17 is a work holding drum 18 comprising a hub 19 having a laterally extending web portion 20 radiating from one end thereof and a rim portion 21 overhanging the hub portion 19. The hub portion 19 extends slightly beyond the distal edge of the rim portion 21 and the driving sprocket 15 is fixed thereto. The exterior peripheral surface of the rim portion 21 of the drum is generally circular and is interrupted at equally spaced points by flat surfaces 22 here shown as four in number and disposed in planes normal to centrally disposed radii and at equal radial distances from the axis of the shaft 7. Mounted on each of said flat surfaces is a work holding clamp means most clearly shown in Figs. 4, 5, 6, and 7. Each surface 22 at the center thereof is provided with a hole 23 extending radially through the rim and centrally of the hole 23, the rim 21 is provided with a slot 24 extending in a direction normal to the axis of the shaft 7. Fixed to the surface 22 at each side of the slot 24 and extending parallel to the length thereof are a pair of guide members 25, 25 having opposed ways 26, 26 extending parallel to the length of the slot 23. Slidably mounted in the ways 26, 26 are jaw supporting members 27, 27 normally urged away from each other by a compression spring 28. At the ends thereof remote from the adjacent ends thereof, the members 27, 27 are provided with opposed slots 29, 29 terminating in oppositely inclined faces 30, 30 which are simultaneously engaged (see Fig. 6) by the correspondingly inclined faces 31, 31 of the bifurcated end 31' of a jaw compressing member 32 slidably mounted in the slot 24 and having a shank portion 33 guided by a bushing 33' mounted on the hole 23; said bushing at its outer end having a slot 34 in registry with the slot 24 for further guidance of the bifurcated end 31'. At its inner end the shank 33 carries a yoke member 35 fixed thereto by a screw 36; said yoke member between its ends carrying a roller 37 rotatably mounted on a bolt 38. The side of the yoke member nearest the web 20 of the drum 18 engages a pair of guide pins 39, 39 projecting parallel to the axis of the shank 33 and carried by a flat surface 40 adjacent the hub of the drum 18 as best shown in Figs. 4 and 7. Journalled on the exterior surface of the drum hub 19 adjacent the outer end thereof is a stationary collar 41 including an arm 41' secured to the frame of the machine and having an exterior cam surface 42 engaged by the roller 37 under the influence of the compression spring 43 surrounding the shank 33 and reacting between the opposed faces of the bushing 33' and the yoke member 35 (see Fig. 7) and the collar 41 is provided with an arm 44 which extends downwardly and is secured to the base platform 2. The jaw supporting members 27, 27 have removable work holding jaws 45, 45 mounted thereon the jaws in the illustrated embodiment being adapted to hold pipe T's designated W and the machining means to be described in detail later being adapted to drill and tap the end openings and the side opening thus completing the T's in a single pass through the machine.

Referring to Fig. 4, the drum 18 is shown as rotating counterclockwise and the work holding stations carried thereby are designated as A, B, C and D. At the point shown, station A is opened by the cam surface operating in opposition to the spring 43 to move the member 31' outwardly and allowing the spring 28 to separate the members 27, 27 and the jaws 45, 45 carried thereby for reception of a work piece W. At the same time stations B and C are opposite certain of the machining devices ready for the performance of their operations thereon; the cam 42 in this region being depressed sufficiently to allow the springs 43 associated with these stations to cause the jaws 45, 45 associated with those springs to grip the work pieces mounted at those stations, while at station D. The cam 42 has caused the jaws 45, 45 to open and to allow the work held therein to drop therefrom. As the drum rotates the operator places a work piece in the open jaws at station A and continued rotation of the drum will cause the roller 37 to move over the lower portion of the cam surface with resultant gripping of the work piece by the time that station reaches the position now occupied by station B. After being subjected to the various machining operations the workpiece approaches the point now occupied by station D and the cam effects the separation of the jaws and release of the work piece; the jaws remaining separated until after the revolution of the drum is completed and another workpiece placed therein. Thus once the machine is set in operation, the operator merely places new work pieces in the jaws of the various stations as they pass the point occupied by station A in Fig. 4.

The mounting means for the machining units comprises disc like members 46 and 47 of greater diameter than the drum 18 having, respectively, hubs 48 and 49 mounted for free oscillation on the shaft 7 with the discs disposed in close adjacency to the opposite sides of the drum 18. At one point in their circumference, the disc like members are provided with segmentally shaped cutaway portions 50 and 51; said portions being adjacent and between the different successive machining stations and being at the upper portion of said members so that the members are unbalanced and will tend to turn in a clockwise direction after having been carried in a counter clockwise direction with the drum 18 as will be later explained. Adjacent the sides of the cutaway portions 50 and 51 the disc like members are interconnected by inverted U-shaped members 52 and 53 secured thereto by screws 54 said members serving additionally to support machining units operating in lines normal to the axis of the shaft 7.

All of the machining units are alike except for the indexing mechanism associated with and operated by the unit designated as the "master" unit and so far as the description of construction of the master unit is concerned, the same description will apply to the other units. The illustrated units are one of many types of machine tool units available for inclusion in machine tool assemblies and it will be appreciated that with appropriate adaptation in the mounting means other makes of units may be as readily installed instead of those shown. There is no need that all such units be alike as will also presently appear.

Figure 3:
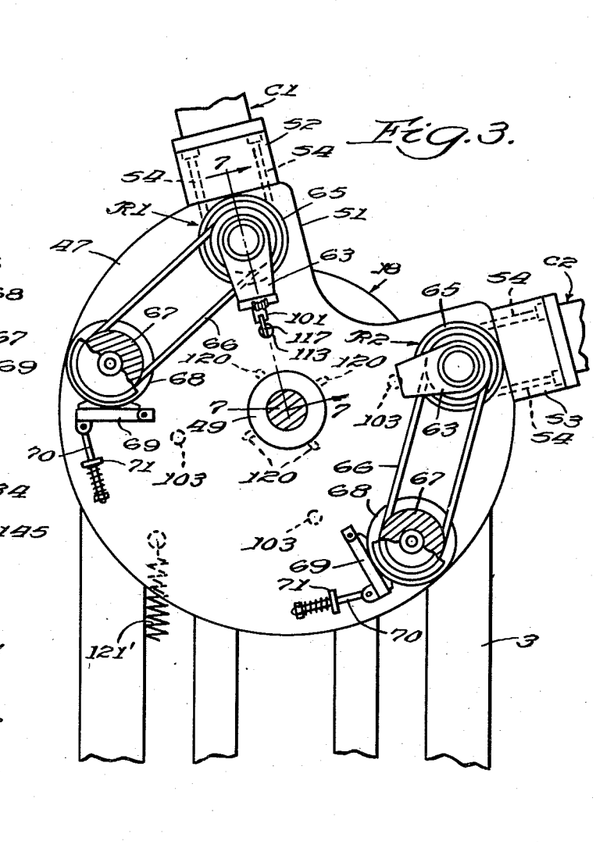
Fig. 3 is a slightly enlarged, transverse sectional view taken on the line 3—3 of Fig. 1 and showing construction as viewed from the right hand side of the machine inwardly of the bearing support for the main supporting shaft of the machine.

Referring to Fig. 7, the illustrated machining unit generally designated as 55 comprises a frame 56 of generally cylindrical form having at one end thereof an external cylindrical machined surface 57 terminating in a flange portion 58. The end surface 57 is closely fitted into an opening 59 in the disc like member 47 in line with the centerline of the machining operation to be performed on the work and the frame 56 is secured in place by screws 60. The frame 56 projects laterally away from the outer face of the member 47 and at its distal end is provided with an inboard bearing assembly 61 and an outboard bearing assembly 62 carried by a bracket arm 63. Journalled in the bearing assemblies is a drive shaft 64 carrying a plural step pulley 65; the pulley being connected by a belt 66 to a companion pulley 67 carried by a motor 68 mounted on a pivoted platform 69 carried by the disc like member 47 as best shown in Fig. 3. A spring biased bolt 70 passing through an ear 71 projecting laterally from the face of the member 47 provides a means for maintaining belt tension.

On the opposite side of the bearing 61 from the pulley 65 the shaft 64 extends into the frame 56 with a splined end 72 which slidingly engages the splined interior of a sleeve 73. Clamped to the exterior of the sleeve 73 between a shoulder portion 74 and a nut 75 threadedly engaging the end of the sleeve 73 adjacent the bearing 61 is an externally threaded sleeve 76 which threadedly engages the threaded interior surface 77 of a sleeve 78 having a flange 79 engaging the end of the bore 80 extending through the frame 56 and the flange is secured against endwise movement by engagement between the frame end surface 81 and the end portion 82 thereof which carries the bearings 61 and 62 and which is secured to the end of the frame 56 by a series of screws, one of which is shown at 83. A dowel pin 84 serves to hold the sleeve 78 against rotational movement.

Slidingly mounted in the bore 80 is a quill sleeve 85 within which a drill spindle assembly 86 is mounted for rotation on bearings 87, 87; said drill spindle assembly including a splined end 88 loosely engaging the interior of the sleeve 73 and being secured against relative endwise movement by a key 89 held in position by a spring collar 90 mounted on the exterior of the sleeve 73. At its opposite end the spindle assembly carries a chuck 91 carrying a cutting tool here shown as a drill 92. The side of the frame 56 adjacent the shaft 7 is provided with a slot 93 extending parallel to the axis of the bore 80 opening into the bore, and spaced from the slot 93 and reciprocable parallel to the axis of the bore 80 is a rod 94 mounted in spaced bearings 95 and 96 formed respectively in the flange 58 and in a lug 97 extending outwardly from the end of the frame 56 adjacent the frame portion 82; there being clearance bores in alignment with the said bearings in the members 51 and 82 for unobstructed movement of the ends of the rod therethrough. Mounted on the rod 94 is a yoke member 98 having a radially extending stud 99 engaging a hole 100 in the quill sleeve 85. The rod 94 passes through the bifurcated ends of the yoke member 98 and disposed between said ends a latch member 101 is secured to the rod with a screw 102 thus preventing movement of the yoke member lengthwise of the rod.

Since the sleeve 76 is fixed to the sleeve 73, upon rotation of the shaft 64 in one direction the threaded engagement between the sleeves 76 and 78 will cause the sleeve 73 to be moved endwise in one direction carrying the quill and drill spindle assembly with it; the splined connection between the sleeve 73 and the end 72 of the shaft 64 permitting such movement, while rotation in the reverse direction will effect endwise movement in the opposite direction. Thus, rotation in one direction will rotate a drill and simultaneously feed it into the work piece while opposite rotation will withdraw the drill; the rate of feed being determined by the lead of the screw threads between the sleeves 76 and 78. With modern cutting tool materials or with work formed of non-ferrous alloys or metals as well as the more readily machined ferrous materials, the rate of feed thus obtained can be employed. For tapping or external threading, the threads between the said sleeves are of the same lead as the threads to be formed. For those operations in which a rate of feed too fine to be achieved by the above arrangement is required, a modified form of feeding means is provided which will be later discussed in detail.

Figures 1, 9A:
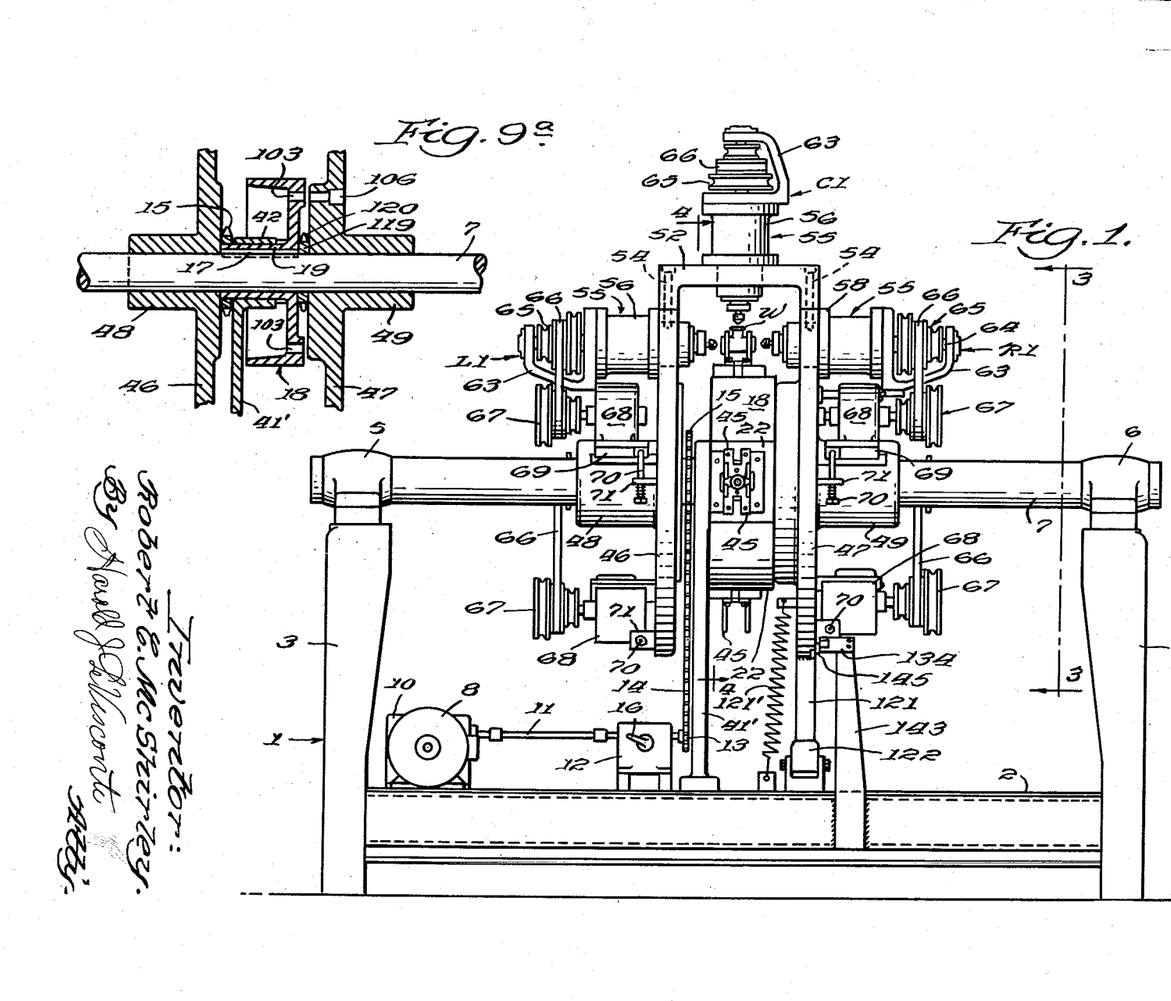
Fig. 1 is a front or loading side elevation of a semi-automatic machine embodying the above invention, the illustrated machine being arranged to drill and tap the three openings of pipe T castings with resultant completion of the fittings in a single operation.
Fig. 9a is a fragmentary sectional view taken on the line 9a—9a of Fig. 2.

For convenient identification, the master unit being here shown as the first one to engage the work on the right hand side as viewed in Fig. 1 will be designated as R1, the opposite unit as L1, the accompanying vertical unit as C1, and the succeeding units as R2, L2, and C2, respectively. Preferably, either of the right hand units might be employed as the master unit as will hereinafter be apparent, as will also be apparent that by suitable modification of the indexing means about to be described, any of the other units might be employed as the master unit. Each of the units other than R1 is identical therewith except that the equivalent of the rod 94 is held stationary and the quill sleeve rotation preventing yoke member is allowed to slide along the rod; the reciprocation of the rod 94 with the sleeve and drill spindle in the master unit providing a convenient means of effecting certain control functions as will be hereinafter described. In the arrangement here shown, the first units core drill the T casting and the following units tap the threads therein and all motors of all units start, stop and run in one direction or the other in unison in response to control means which will now be described.

The face of the drum 18 adjacent the member 47 and adjacent to the outer diameter of the drum is provided with a series of horizontal holes 103 one each in fixed relation to each work holding station. The member 47 adjacent to the point thereon at which the master unit R1 is mounted is provided with a horizontal hole 104 at the same radial distance from the axis of the shaft 7 as the hole 103 and mounted for reciprocation in the hole 104 is a plunger or bolt 105 of a diameter adapted to closely engage the hole 103. Preferably, the hole 103 is of larger diameter than the plunger and is provided with a replaceable bushing to permit the compensation for wear. The hole 104 at the end thereof remote from the drum 18 is counterbored as at 106 to provide clearance and housing for a compression spring 107 surrounding the bolt and reacting between a shoulder 108 on the bolt and a collar 109 surrounding the bolt and secured to the member 47 counterbored end of the hole 104; the said shoulder 108 by engagement with the bottom of the counterbore serving to limit the extent of movement of the bolt into the holes 103 in the drum as they come into registry therewith. The opposite end of the bolt extends beyond the outer face of the member 47 and terminates in an enlarged detachable head portion 110 providing a side surface 111 and a shoulder 112 engaged by the latch 101 member in the manner and at the times to be later described.

Figure 2:
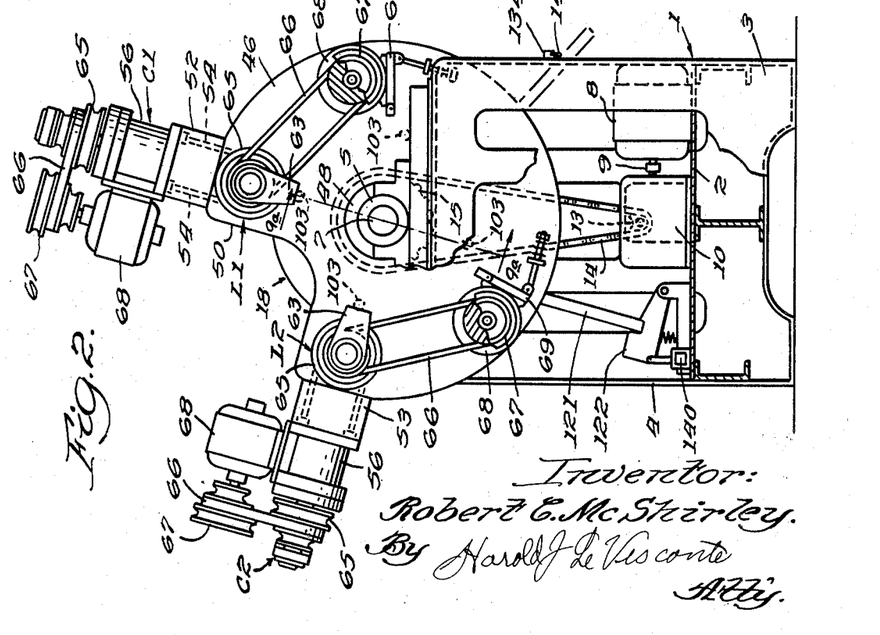
Fig. 2 is a left hand elevation of the machine shown in Fig. 1 with certain parts broken away for clearness of illustration of parts otherwise concealed.
Figure 11:
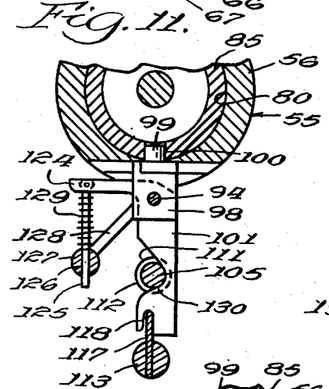
Fig. 11 is a fragmentary, sectional view taken on the line 11—11 of Fig. 10 showing the relation of the indexing pin latch means at the point in the cycle of operation represented by Fig. 10.
Figure 12:
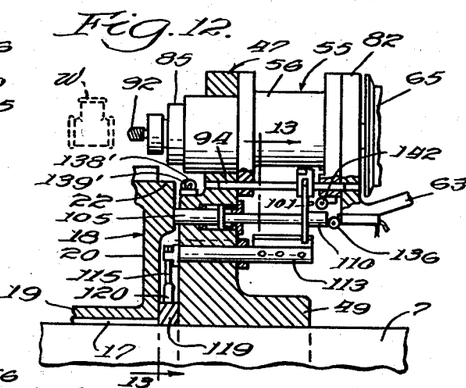
Fig. 12 is a view similar to Fig. 10 but showing the relation of the parts at the time of the release of the latch means and indexing pin preliminary to the start of the next machining operation.
Figures 13, 14, 15:
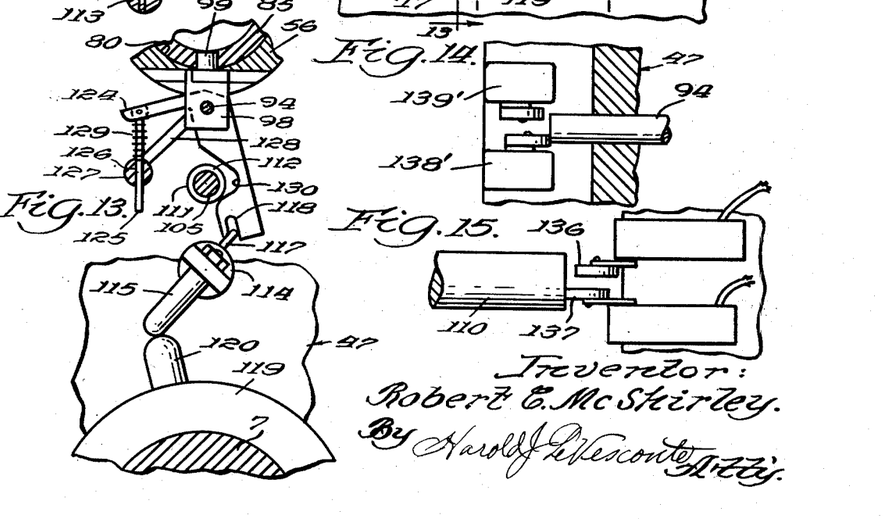
Fig. 13 is a view on the line 13—13 of Fig. 12 and showing the position of the latch release and the means effecting such release.
Fig. 14 is an enlarged fragmentary plan view of the switches and actuating means therefor operable to stop and reverse the driving motors of the machining units.
Fig. 15 is a corresponding view of the switch means for releasing the machining assembly and for start-driving motors of the machining units.

Mounted for oscillation in a bore in the member 47 disposed parallel to and between the axes of the shaft 7 and the hole 104 is a rock shaft 113 having at the end adjacent the side of the drum 18 a flange 114 and an arm 115 normally projecting radially toward the axis of the shaft 7. At the opposite face of the member 47 the shaft 113 carries a collar 116 which cooperates with the flange 114 to hold the shaft 113 against endwise movement. The other end of this shaft is slotted and carries a radially extending flange member 117 secured therein; the said flange being straddled by a complementary notch 118 in the end of the latch member 101 as best shown in Figs. 11 and 13. Fixed to the shaft 7 between the adjacent faces of the drum 18 and the member 47 (see Fig. 7) is a collar 119 having a radially spaced series of cams 120; the number and spacing of said cams being the same as the number and spacing of work stations carried by the drum 18. The cams are positioned in the path of the arm 115 and as the shaft 7 rotates the cams 120 successively engage the arm 115 causing the arm to rock the shaft 113 sufficiently to allow the cams to pass beneath the arm. The starting point of each cycle of operation is shown in Fig. 2 in which a radially extending arm 121 fixed to the member 47 is engaged in a solenoid released spring latch 122. The latch includes a switch 123 in series with the solenoid coil and when the latch 122 is engaged with the arm 121, the switch 123 is closed and is open when the arm is released and the latch is moved by its spring to a higher level than when engaged with the arm 121. The latch member 101 at its upper end is provided with a laterally extending arm 124 at the free end of which one end of a rod 125 is pivotally connected; the other end of said rod slidingly engaging a hole 126 in a rock member 127 carried by a laterally extending bracket arm 128 fixed to the side of the quill guiding member 98. A compression spring 129 surrounding the rod 125 and reacting between the arm 124 and the rock member 127 constantly urges the latch member 101 and the rod 94 to which it is secured in a clockwise direction as viewed in Figs. 11 and 13. The side of the latch member 101 adjacent the bolt head 110 is provided with a notch 130 which is so positoned that when the latch member is moved with the quill to the left as viewed in Figs. 7, 10 and 12, sufficiently to clear the left hand end of the head 110, the action of the spring 129 will cause the latch member 101 to engage the side of the bolt and on movement of the quill to the right incident to reaction of the drill, the latch member 101 by engagement with the end surface 112 of the bolt head will carry the bolt with it with resultant withdrawal of the bolt from the hole 103 in the drum 18.

The remaining mechanism can be most readily described in connection with a recitation of cycle of operation. The power supply in the illustrated embodiment of the invention is illustrated as including a 220 v.-3 phase source 131 for the motors and a 110 v. A. C. source 132 for the control means. The motor current extends through a manually opened and closed starting switch 133, thence through an override preventing switch 134 and thence to a solenoid operated forward and reverse and stop and start switch mechanism 135 and thence to all of the machining element motors for the simultaneous operation thereof. Remote controlled motor operating switches being a standard article of commerce, the illustration of the various circuits therein are not deemed necessary.

Assuming that the machine is operating and that an operator is placing work pieces in the work holding jaws 45 in the drum 18 as they approach the point of loading as already explained, the cycle of operation will be described as starting at the time when the members 46 and 47 are stationary with the arm 121 engaged by the latch 122 and one of the cams 120 rotating with the shaft 7 is just approaching the arm 115. At this time the bolt 105 is held retracted from the drum 18 by engagement by the latch 101 which has engaged the shank of the bolt and then been moved to the right incident to retraction of the drill spindle and quill as part of the completion of the previous cycle; the position being shown in Fig. 12. As the cam 120 contacts the arm 115 and causes the arm and shaft 113 to rock in a clockwise direction as viewed in Fig. 13 with consequent shifting of the latch 101 by the flange 117 laterally free of the head 110 of the bolt 105 allowing the spring 106 to shift the end of the bolt 105 into contact with the side face of the drum 18. When fully retracted, the end of the head 110 of the bolt 105 engages two normally closed switches 136 and 137 in the control circuit and holding them open. As the bolt moves forward the switch 136 is allowed to close first followed closely by the closing of the switch 137. The switch 136 is in series with a circuit extending between the leads 138 and 139 of the control power source and including the solenoid 140 which operates to disengage the latch 122 from the arm 121. At that instant one of the indexing holes 103 comes into registry with the latch bolt and the bolt enters that hole starting to carry the machining assembly comprising the members 46 and 47 and the machining units carried thereby with the rotating drum and shaft. As this interlocking of the work carrying and machining units is taking place, the closing of the switch 137 has operated the switch mechanism 135 to start the motors in forward rotation with resultant advancing of the drills and taps carried thereby into the work. As they thus advance, the quill sleeve 85 of the master unit R1 carries the rod 94 with it to the left until that rod at the end which extends through the member 47 contacts first a normally open switch 138' which operates to actuate the switch mechanism 135 to stop the motors and immediately thereafter contacting closing a normally open switch 139' which operates to cause the switch mechanism to reverse the motors. During the forward movement of the drill spindles and in the case of the master unit R1, the simultaneous movement of the rod 94 and the parts carried thereby, the release of the latch 101 permitting the initial advance of the latch bolt 105 and the passing of the cam 120 beyond the arm 115 has permitted the spring 129 to bring the latch 101 back against the bolt 105, but the bolt having moved to the left as viewed in Figs. 7, 10 and 12, the notch 130 first engages the head 110 of the bolt. During the advance of the drill spindle assembly the latch 101 being fixed to the rod 94 is also moved to the left and eventually passes beyond the shoulder 112 of the bolt head whereupon the spring 129 acts to bring the notch 130 into engagement with the shank of the bolt 105. Thus during the retraction of the tools due to the reversal of the motors, the latch 101 engages the shoulder 112 of the bolt head 110 and carries the bolt with it until the bolt is retracted from the hole 103 in the drum 18 at which time the unbalanced mass of the machining assembly under the urge of the tension spring 121' serving as a means of initial reversing inertia begins to move in opposition to the rotating drum. Also, at this time, a feeler point 141 carried by the latch 101 engages a normally open switch 142 in the control circuit and closes that switch with resultant actuation of the switching mechanism 135 to stop the reverse rotation of the motors. At about this time, the reverse movement of the machining assembly brings the arm 121 into engagement with the latching means 122 and the outward movement of the bolt head 110 has already opened the switches 136 and 137 with resultant completion of the operational cycle. To prevent damage from the accidental jamming of a tool or other faulty operation failing to release the machining assembly in time, the frame structure includes a member 143 disposed adjacent the path of the arm 121 and carrying the switch 134 having an operating arm 145 disposed in the path of the arm 121 at a point beyond which the machining assembly is to be prevented from passing incident to being locked to the work carrying drum; said switch operating to be opened by the arm and to cut off both the power and control circuits. Upon restoring of the mechanism to operative condition, the switch 134 is closed manually.

The advantage derived from the principle of the constantly rotating work holder and the oscillating mounting for the machining units is obviously subject to many modifications with respect to the type of operations to be performed by the machining units. For example, the number of work holding stations may be varied in different machines to suit a general type of work to be performed. Further, the successive machining units on any side of the work need not perform their operations at the same point on the work, but may be at different points as in drilling two separate holes. The type of machining operation is not limited and may be drilling, tapping, milling, or turning or threading exterior surfaces. Still further, in those instances in which the operation is merely drilling or tapping or some other operation requiring only a single machining unit, each work station may be designed to hold two work pieces so that the two machining units each operate on one of the work pieces in adjacent work holding stations with resultant doubling of the capacity of the machine.

From the foregoing, it is believed to be obvious that the illustrated embodiment of the invention is merely one of many forms and that in general, the machines would be built for specific uses where the economy of high production rates would justify the cost involved. Thus, these examples illustrate the wide range of the usefulness of the novel principles of operation which is realized from the continuously rotating work holding drum and the concentrically disposed and oscillating machining assembly operating in conjunction therewith with the capacity of variation in the elapsed time in the cycle of operation to reduce idle time to the minimum for a given type of work.

Referring next to the form of the invention shown in Figs. 16 through 19, and 21, the illustrated modification is for those uses in which the tool feed is effected through pneumatic cylinders instead of the previously illustrated screw feed means. The illustrated embodiment is shown in relation to the master unit, it being understood that all or part of the other units may be similarly equipped. All similar parts are identified by the same numerals as in the first described form of the invention although, in the case of certain of the controlling switches, the functions thereof have been modified as will presently appear.

Figures 16, 18, 19:
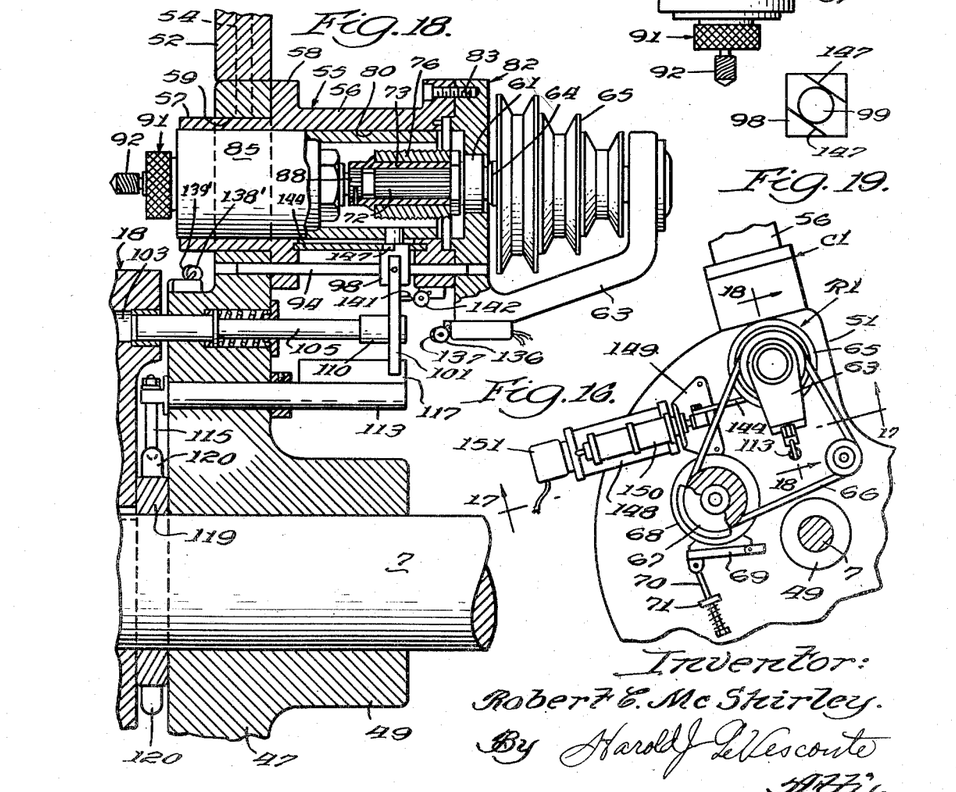
Fig. 16 is a fragmentary view corresponding to the upper left hand portion of Fig. 3, but showing the use of a pressure operated tool feed means.
Fig. 18 is an enlarged sectional view taken on the line 18—18 of Fig. 16.
Fig. 19 is an end elevation of the quill sleeve restraining element.
Figure 17:
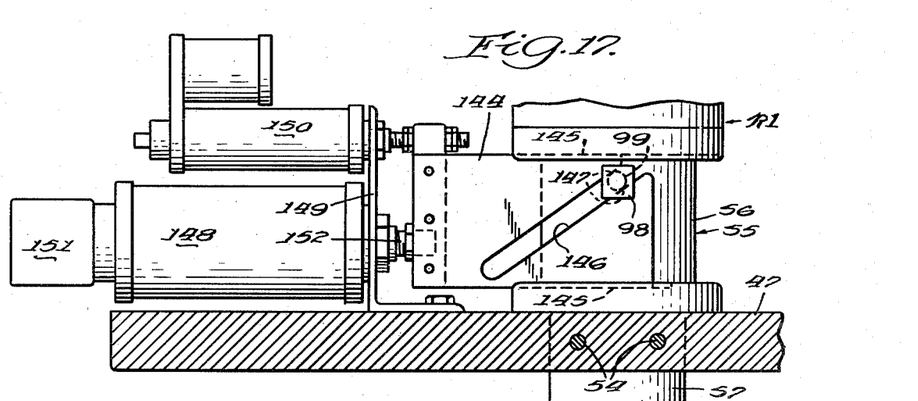
Fig. 17 is an enlarged sectional view of the said feed means taken on the line 17—17 of Fig. 16.
Figure 20:
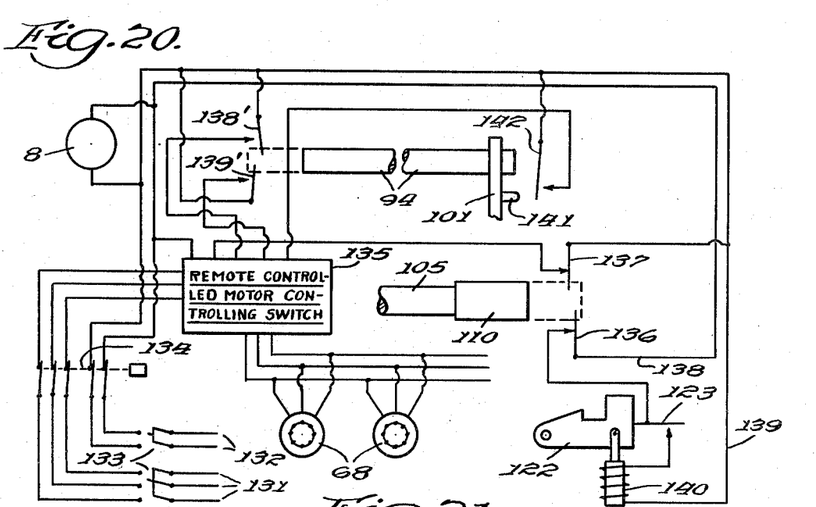
Fig. 20 is a circuit diagram of the control and power circuits employed in the form of the invention shown in Figs. 1 through 15.

In this form of the invention, the threaded sleeve 78 is omitted and the feed and retraction movements of the drill spindle are derived from a cam plate 144 having the side edges thereof guided for reciprocation transversely to the direction of endwise movement of the spindle in guiding grooves 145, 145 formed in the machining unit frame 56 radially outward from and adjacent to the slot 93 in which the end of the member 98 moves. The cam plate is provided with a diagonally extending slot 146 and the member 98 adjacent to the end 99 thereof is provided with complementary guiding faces 147, 147 on the portion thereof which extends through the slot 146 whereby movement of the cam plate 144 in the guides 145, 145 will effect endwise movement of the drill spindle. The cam plate 144 extends laterally beyond one side of the machining unit and is connected to a pneumatic cylinder 148 mounted on a bracket 149 attached to the side of the member 47; said cylinder also including a check cylinder 150 filled with fluid and having a small opening through the piston thereof and operating to check the rate of travel in the feeding direction. Additionally, the cylinder 148 includes a solenoid operated valve means 151 operable by the control means to cause the piston to travel first in one direction and then in the other with resultant advance and retraction of the spindle and tool.

Figure 21:
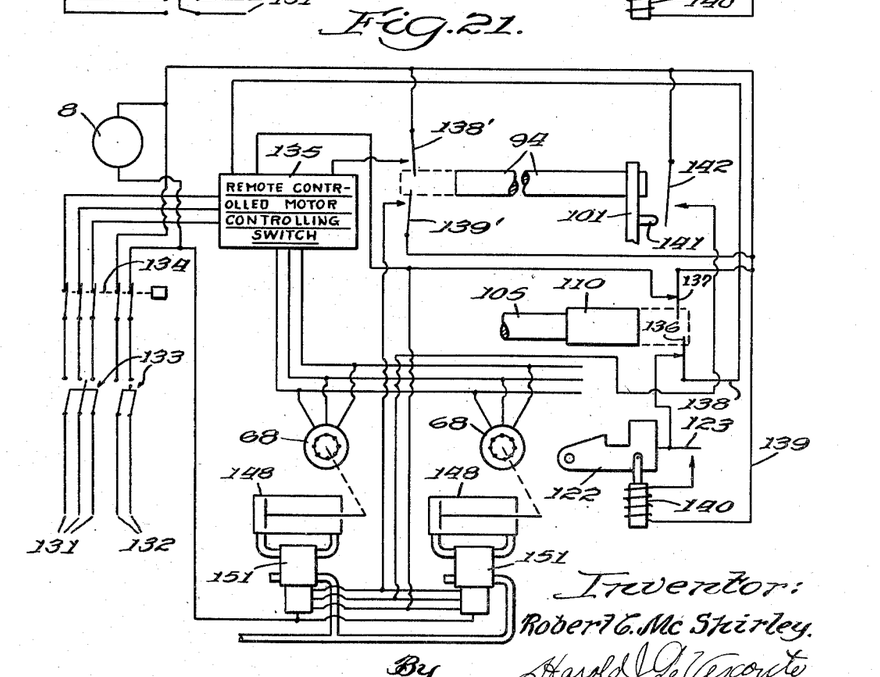
Fig. 21 is a circuit diagram of the control, motor operating and tool feeding circuits employed in the form of the invention illustrated in Figs. 16 through 19.

The indexing engagement of the bolt 105 with the holes 103 in the drum and the latching and latch releasing action of the latch 122 is identical with the structure previously described. As the bolt moves forward into engagement with the drum with resultant closing of the switch 136 to release the latch 122 and the switch 137 to start the motor through the motor controlling means 135, the closing of the switch additionally energizes the solenoid operated valve 151 to admit air to the end thereof with resultant movement of the piston rod 152 thereof to the right as viewed in Figs. 17 and 18 and consequent movement of the cam plate 144 in a direction to advance the rotating spindle to the work piece. When the spindle has advanced to the point at which the end of the rod 94 engages the switches 138' and 139' in that succession and effecting the closing thereof, the closing of the switch 138' will operate the motor control means 135 to stop the motors and the closing of the switch 139' actuate the valve 151 to reverse the valve and admit the air to the opposite side of the piston with resultant retraction of the spindle and tool from the work piece. This retraction of the spindle and tool continues until the feeler 141 on the latch member 101 engages and closes the switch 142 and this switch being connected to both coils of the solenoid valve 151 will move the valve to an intermediate position cutting off the supply of air to both sides thereof. Within a few seconds thereafter, the latch member will be moved sideways by the rocking of the shaft 113 at the start of the next cycle, thus breaking the current supply to the valve. In the specific arrangement shown, the switch 142 is closed just prior to the opening of the switch 137 by the rearward movement of the bolt head 110 and since the switch 142 is interposed between the leads supplying the current to the respective coils of the solenoid, the simultaneous energization thereof will move the solenoid armature to the intermediate position with resultant movement of the valve to such position. In Fig. 21, the cylinder, piston and valve have been shown diagrammatically, it being understood that solenoid operated valve and cylinder assemblies may be purchased on the open market.

While Figs. 16, 17 and 18 show only the master unit and the control mechanism associated therewith, it will be understood that additional units may be employed with the starting and stopping of the motors and the operation of the feed cylinders simultaneously controlled by the switches and other control apparatus associated with the master unit. This is indicated in Fig. 21 by the showing of two motors with the feed cylinders associated therewith, either of which motors being the motor associated with the master unit.

The foregoing examples of typical control and operating circuits are by way of showing means by which the control of the machine may be operated, it being understood that in the achievement of the principal object of the invention, the use of the constantly traveling workholding means and the oscillating machining unit carrying means operating in conjunction therewith, still other circuits may be employed to control the operation of the machining units according to the character of the units. The essential characteristic, however, is that the operation of the machining units be interlocked with the means by which the oscillating assembly on which the units are carried is coupled to and uncoupled from the constantly and unidirectionally moving work carrying means. Additionally, while the disclosed embodiments of the invention relate to machining means, it will be appreciated that the principle of the advancement of tools coincident with the interlocking thereof to a continuously moving work carrier is not necessarily limited to metal cutting devices and that inspection devices or other rotating or non-rotating elements together with suitable supporting and actuating means may be substituted for the illustrated tools with equal advantage. Therefore, the invention is to be deemed to include all such modifications in the parts and in the construction, combination and arrangement of parts as shall come within the purview of the appended claims.

I claim:

1. In a machine tool, a frame structure, a drum rotatably mounted on said frame structure, driving means connected to and effective to constantly rotate said drum, a plurality of circumferentially spaced work holding devices mounted on the periphery of said drum; each of said devices including means for releasably gripping a work piece, means for maintaining said work piece gripping devices in gripping position during the excursion thereof through one segment of the path of revolution of said drum, other means effective to maintain said gripping devices in work releasing position during the remainder of the excursion thereof along the path of rotation of said drum, a work performing apparatus mounted for movement about the axis of rotation of said drum and including a tool movable into and out of work performing engagement with a work piece held in one of said gripping devices, means for effecting synchronous rotative movement of said apparatus and said drum with said tool aligned with the point on the work piece to be machined thereby, power means connected to said tool effective to cause said tool to perform a predetermined operation on the work piece with which it is aligned and to retract said tool therefrom, means connected for movement with said tool and effective upon movement therewith to the point of completion of a predetermined operation by said tool and retraction thereof out of the path of travel of the work to effect the discontinuance of said synchronous movement, means operative upon said discontinuance of synchronous movement to move said work performing apparatus reversely to the rotation of said drum about said axis, and releasable means for terminating said reverse movement at a fixed point in relation to said frame.

2. In a machine tool a frame including spaced, aligned bearings, a shaft journalled in said bearings, power means connected to said shaft effective to impart uninterrupted rotation to said shaft in said bearings; said power means including means for varying the rate of rotation of said shaft, a work holding drum fixed to said shaft, a plurality of normally closed work holding devices mounted on said drum and arranged in circumferentially spaced relation about the periphery of saids drum, stationary means carried by said frame operative to maintain said work holding devices in open position during their successive passage through a predetermined portion of the path of movement of said drum, machining unit supporting means movable in reverse directions about the axis of said shaft, a machining unit including a tool and a driving motor therefor mounted on said supporting means, latch means normally effective to hold said supporting means stationary, other latch means effective to interconnect said drum and said supporting means in fixed relation to each of said work holding devices during a portion of the rotation thereof with said drum for synchronous movement therewith, means normally restraining said other latch means from effecting said interconnection, means rotating with said drum effective to cause said latch restraining means to release said other latch means at a predetermined time relative to the approach of a work holding device to a predetermined point in the path of said drum, means actuated by release of said other latch means to release said first latch and to start operation of said machining unit, means connected for movement with said unit and rendered effective upon completion of a machining operation by said unit to move said tool out of the path of the work and to cause said other latch means to disconnect said supporting means and said drum, and means effective upon said disconnection to return said supporting means into engagement with said first latch means.

3. In a machine tool, a frame structure including a pair of spaced aligned bearings, a shaft journalled in said bearings, power means for constantly rotating said shaft including means for varying the rate of rotation of said shaft by said power means, work holding means comprising a drum fixed to said shaft and having a plurality of spring closed work holding devices disposed at circumferentially spaced points about the perimeter of said drum, means fixed to said frame structure and engaging said work holding devices and moving them to open position successively as they pass between predetermined points incident to rotation with said drum, a work piece machining mechanism including a rotatable and endwise movable spindle and a tool carried by said spindle, a driving motor operatively connected to said spindle, means supporting said motor and spindle freely mounted on said shaft adjacent to said drum and restrained against movement endwise of said shaft, a first latch means normally restraining said supporting means against rotative movement on said shaft, a second latch normally urged to effect interconnecting interengagement between said drum and said supporting means with resultant synchronous movement thereof, latch release means normally restraining said second latch means from effecting said interengagement, means rotatable with said shaft effective to actuate said latch release means to release said second latch, means actuated by said second latch upon release thereof to release said first latch and to energize said motor with resultant rotation of said spindle and said tool, means for simultaneously effecting endwise movement of said spindle with resultant performance of a machining operation on a work piece held in one of said work holding devices, means movable with said spindle and rendered operative upon advancement of said spindle to a predetermined point to effect in succession the stopping of said motor, the retraction of said spindle and tool and the withdrawal of said second latch means from said interengagement, and means for moving said supporting means in a direction opposed to the direction of rotation of said shaft until said supporting means is re-engaged by said first latch means.

4. In a machine tool, a rotatable drum mounted in a frame structure, power means for imparting uninterrupted rotation to said drum at infinitely variable speeds, a plurality of work holding devices mounted in circumferentially spaced relation about the periphery of said drum, means for operating said devices to and from work piece gripping and work piece releasing positions, machining means disposed adjacent to said drum and mounted for oscillation about the axis of rotation of said drum, and including a rotatable, tool carrying spindle and a driving motor therefor, means for interlocking said machining unit and said drum for coincident movement with said machining unit disposed in predetermined relation to one of said work holding devices; said interlocking means being simultaneously effective to cause a tool carried by said spindle to perform a predetermined machining operation on a work piece held in said one of said work holding devices, means movable with said spindle and effective to stop the machining operation at a predetermined extent, means for moving said spindle bodily to remove the tool carried thereby from contact with the work piece, means for releasing said interlocking means at the completion of removal of the tool from the work piece, and means for moving said machining means reversely to the direction of rotation of said drum for similar interlocking engagement with said drum at the next following of said work holding devices.

5. In a machine tool, a rotatable drum mounted in a frame structure, power means for imparting uninterrupted rotation to said drum including means for varying the speed of rotation of said drum, a plurality of work holding devices mounted on the periphery of said drum and disposed in circumferentially spaced relation thereon, means for moving said devices to and from work piece gripping and releasing positions, machining means comprising a support mounted for oscillation about the axis of rotation of said drum and a pair of machining units; each including a rotatable spindle and a tool carried thereby, a motor and means connecting the motor to the spindle for rotating the spindle mounted on said support; said spindles being so disposed angularly with respect to the axis of oscillation of said support as to be opposite the points of engagement with work pieces held in adjacent ones of said work holding devices, means for interlocking said support and machining units to said drum for coincident movement with said machining units positioned for engagement with the work pieces held in two adjacent work holding devices, means initiated by said interlocking means for causing said machining units to perform predetermined machining operations on the respective work pieces, means movable with one of said spindles operative to stop the operations of both of said units at a predetermined extent, means for moving said spindles and the tools carried thereby bodily away from the work pieces, means for releasing said interlocking means at the completion of said bodily movement of said spindles and tools, and means for moving said support and machining units reversely to the direction of rotation of said drum for similar interlocking engagement with said drum at the next following one of said work holding devices whereby the machining unit in advance with respect to the direction of rotation of said drum will operate on a newly presented work piece and the other of said units will operate on the work piece first operated on by said unit disposed in advance of the other.

6. In a machine tool, a frame structure, a drum mounted for rotation on said frame structure, power means for imparting uninterrupted rotation to said drum, a plurality of work piece holding devices mounted in predetermined spaced relation about the periphery of said drum and means for opening and closing said devices as they pass predetermined points with reference to said frame structure, machining means comprising a support mounted for oscillation about the axis of rotation of said drum and a pair of machining units mounted on said support and positioned for simultaneous machining contact with different portions of a work piece held in one of said devices; each of said machining units comprising a rotatable spindle and a tool carried thereby, a motor and means connecting the motor to the spindle for rotating the spindle, means for interlocking said machining means to said drum for coincident movement therewith with the tools carried by said spindles positioned opposite the points on the work piece to be engaged thereby, means effective upon initiation of said interlocking to cause said machining units to perform predetermined operations on the work piece, means operated by one of said units to stop operations by both of said units after the operation of said one unit has progressed to a predetermined extent, means operative upon said stopping of machining operations to cause said spindles to move the tools carried thereby bodily away from the work piece, means operative at and by the completion of said bodily movement of said spindles and tools to release said interlocking means, and means for moving said support and machining units reversely to the direction of rotation of said drum for similar interlocking engagement with said drum in corresponding relation to the next following one of said work holding devices.

7. In a machine tool, a frame structure, a drum mounted for rotation on said frame structure, power means for imparting uninterrupted rotation to said drum, work holding means comprising a plurality of work piece holding devices mounted in predetermined spaced relation about the periphery of said drum and means for opening and closing said devices as they pass predetermined points with reference to said frame structure, machining means comprising a support mounted for oscillation about the axis of rotation of said drum and a pair of machining units mounted on said support and disposed one each to engage one each of a pair of work pieces held in adjacent work holding devices; each of said machining units including a rotatable spindle and a tool carried thereby, a motor, and means connecting the motor to the spindle for rotating the spindle, means for interlocking said machining means to said drum for coincident movement therewith with the tools carried by said spindles positioned for engagement with the work pieces carried by adjacent work holding devices, means effective upon initiation of said interlocking to cause said machining units to perform predetermined machining operations simultaneously on the respective work pieces held in said adjacent devices, means operated by one of said units at the completion of the operation performed thereby to stop both of said units and to cause said spindles and tools simultaneously to be moved out of contact with the work pieces, means operated by said one of said machining units incident to said movement of said spindles and said tools out of contact with the work pieces to release said interlocking means, and means for moving said machining means about said axis reversely to the direction of rotation of said drum for similar interlocking engagement with said drum at a point thereon at which the machining unit in advance of the other with respect to rotation of said drum will engage a newly presented work piece held in the next following of said devices and the other of said machining units will engage and operate on the work piece previously engaged by the machining unit disposed in advance thereof.

8. In a machine tool, a frame structure, work holding means comprising a constantly rotating member mounted on said frame structure provided with a plurality of releasable work piece gripping devices arranged in circumferentially spaced relation thereon and disposed in a plane normal to the axis of rotation of said member, power means for rotating said member, work performing means mounted for oscillation about the axis of rotation of said member, means for coupling said work performing means to said member for coincident movement therewith, means for causing said work performing means to execute a predetermined operation on a work piece held in one of said devices, means connected to and movable with said work performing means effective at the termination of said predetermined operation to uncouple said work performing means from said member, and means for moving said work performing means reversely to the direction of rotation of said member coincident with the movement of said work performing means out of the path of travel of the work piece preparatory to being re-coupled to said member for performance of a similar predetermined operation on a work piece held in the next following of said gripping devices.

9. In a machine tool, a frame structure, work holding means comprising a constantly rotating member mounted on said frame structure provided with a plurality of releasable work piece gripping devices arranged in circumferentially spaced relation thereon and disposed in a plane normal to the axis of rotation of said member, power means for rotating said member, machining means mounted for oscillation about the axis of rotation of said member, means for coupling said machining means to said member for coincident movement therewith, means for causing said machining means to execute a predetermined machining operation on a work piece held in one of said devices, means connected to and operated by said machining means effective at the termination of said machining operation to retract the machining means out of the path of the work piece and then uncouple said machining means from said member, and means for moving said machining means reversely to the direction of rotation of said member preparatory to being re-coupled to said member for performance of a similar machining operation on a work piece held in the next following of said devices; said last named means comprising a spring extending between said machining means and said frame structure arranged to have power stored therein incident to movement of said machining means with said member and effective upon the uncoupling of said machining means and said member to return said machining means to the point at which said machining means will again be coupled to said rotating member.

10. In a machine tool, a rotatable drum mounted in a frame structure, power means for imparting uninterrupted rotation to said drum, a plurality of work holding devices mounted in predetermined spaced relation on said drum and disposed in a plane normal to the axis of rotation of said drum, means for maintaining said work holding devices closed during their excursion between predetermined points in their path of travel during each revolution of said drum, other means for maintaining said work holding devices open during the remainder of their travel in each revolution of said drum, machining means disposed adjacent to said drum and mounted for oscillation about the axis of rotation of said drum and including a rotatable tool carrying spindle, a driving motor for rotating said spindle and means for moving said spindle endwise to bring the tool carried thereby into and out of contact with work pieces held in said work holding devices, means for coupling said machining means to said drum for coincident movement therewith, means initiated by said coupling means for simultaneously causing said motor to rotate said spindle and to move said spindle endwise toward a work piece held in one of said devices with resultant performance of a predetermined machining operation on the work piece, means connected to said spindle for movement coincident with said endwise movement effective to limit the extent of said machining operation, means effective on activation of said operation limiting means to move said spindle endwise away from the work piece with resultant removal of the tool from contact with the work piece, means operated by said last named endwise movement of said spindle to uncouple said machining means from said drum, and stored power means energized by said coincident movement of said machining means operable upon the uncoupling of said machining means from said drum to move said machining means reversely to the direction of rotation of said drum preparatory for the re-coupling thereof to said drum for a similar machining operation on a work piece held in the next following of said work holding devices.

11. In a machine tool, a rotatable drum mounted in a frame structure, power means for imparting uninterrupted rotation to said drum, a plurality of work holding devices mounted in predetermined spaced relation on said drum and disposed in a plane normal to the axis of rotation of said drum, means for maintaining said work holding devices closed during their excursion between predetermined points in their path of travel during each revolution of said drum, other means for maintaining said work holding devices open during the remainder of their travel in each revolution of said drum, machining means disposed adjacent to said drum and mounted for oscillation about the axis of rotation of said drum and including a rotatable tool carrying spindle, a driving motor for rotating said spindle and means for moving said spindle endwise to bring the tool carried thereby into and out of contact with work pieces held in said work holding devices, means for coupling said machining means to said drum for coincident movement therewith, means initiated by said coupling means for simultaneously causing said motor to rotate said spindle and to move said spindle endwise toward a work piece held in one of said devices with resultant performance of a predetermined machining operation on the work piece, means connected to said spindle for movement coincident with said endwise movement effective to limit the extent of said machining operation, means effective on activation of said operation limiting means to move said spindle endwise away from the work piece with resultant removal of the tool from contact with the work piece, means operated by said last named endwise movement of said spindle to uncouple said machining means from said drum, and stored power means energized by said coincident movement of said machining means operable upon the uncoupling of said machining means from said drum to move said machining means reversely to the direction of rotation of said drum preparatory for the re-coupling thereof to said drum for a similar machining operation on a work piece held in the next following of said work holding devices; said means for moving said spindle endwise including an externally threaded element fixed to said spindle and threadedly engaging an internally threaded member in which said spindle is mounted for rotation and endwise movement, a reversing switch means interposed between said motor and the source of energy therefor; said reversing switch means being connected to to the means actuated at the initiation of said coupling of said machining means to said drum and being actuated thereby to cause said motor to rotate said spindle in a direction to advance the tool carried thereby into engagement with the work piece and being actuated by said operation limiting means to cause said motor to rotate in the opposite direction with resultant withdrawal of the tool carried by said spindle from the work piece.

12. In a machine tool, a frame structure, work holding means comprising a constantly rotating member mounted on said frame structure provided with a plurality of releasable work piece gripping devices arranged in circumferentially spaced relation thereon and disposed in a plane normal to the axis of rotation of said member, power means for rotating said member, machining means mounted for oscillation about the axis of rotation of said member, means for coupling said machining means to said member for coincident movement therewith, means for causing said machining means to execute a predetermined machining operation on a work piece held in one of said devices, means effective at the termination of said machining operation to retract the machining means out of the path of the work piece and then uncouple said machining means from said member, and means for moving said machining means reversely to the direction of rotation of said member preparatory to being re-coupled to said member for performance of a similar machining operation on a work piece held in the next following of said devices; each of said work gripping devices comprising a pair of jaws movable toward and away from each other, a reciprocable member engaging both of said jaws and having means operable, when said member is moved in one direction, to move said jaws toward each other to grip a work piece therebetween, spring means operative to move said jaws away from each other when said jaw engaging member is moved in the opposite direction, and spring means normally operative to move said jaw engaging member in said one direction in opposition to said first named spring means.

13. In a machine tool, a frame structure, a drum mounted for rotation on said frame structure, power means for imparting uninterrupted rotation to said drum, a plurality of releasable work gripping devices disposed in predetermined circumferentially spaced relation about said drum and in a plane normal to the axis of rotation of said drum, machining means comprising a support mounted for oscillation about the axis of rotation of said drum, a machining unit including a tool carrying spindle mounted for rotation and endwise movement on said support, a motor connected to said spindle for imparting rotation thereto mounted on said support and a fluid pressure actuated means connected to said spindle for imparting endwise movements in opposite directions, latch means for coupling said machining means to said drum for coincident movement therewith when the tool carried by said spindle is opposite the point on a work piece held in one of said devices to be engaged thereby, means initiated by movement of said latch means to effect said coupling effective to start said motor with resultant rotation of said spindle and tool and simultaneously activate said fluid pressure actuated means to move said spindle and the tool carried thereby endwise to perform a predetermined operation on the work piece, means actuated by said endwise movement of said spindle to a predetermined extent to stop said motor and to reverse the action of said fluid pressure responsive means with resultant retraction of said spindle and tool clear of the work piece, means actuated by the completion of said retraction of said spindle to withdraw said latch means with resultant uncoupling of said machining means from said drum, other means operated by withdrawal of said latch means effective to render said fluid pressure means inoperative, and stored power means connected to said frame structure and said machining means energized by said coincident movement effective upon said uncoupling of said machining means to move said machining means in a direction opposed to the direction of rotation of said drum preparatory to the re-coupling of said machining means to said drum in similar relation to the work piece held in the next following work holding device.

14. In a machine tool, a frame structure, work holding means comprising a constantly rotating member mounted on said frame structure provided with a plurality of releasable work piece gripping devices arranged in circumferentially spaced relation thereon and disposed in a plane normal to the axis of rotation of said member, power means for rotating said member, machining means mounted for oscillation about the axis of rotation of said member, means for coupling said machining means to said member for coincident movement therewith, means for causing said machining means to execute a predetermined machining operation on a work piece held in one of said devices, means effective at the termination of said machining operation to retract the machining means out of the path of the work piece and then uncouple said machining means from said member, means for moving said machining means reversely to the direction of rotation of said member preparatory to being re-coupled to said member for performance of a similar machining operation on a work piece held in the next following of said devices, an electrical conductor extending between said member rotating power means and a source of energy, a normally closed switch interposed in said conductor, and a member movable with said machining means operable to engage and open said switch in the event that said coincident movement of said machining means and said rotating member should reach a predetermined maximum permissible extent.

15. In a machine tool, a frame structure, a shaft mounted for rotation in bearings on said frame structure, a drum like member fixed to said shaft and provided with a plurality of releasable work holding devices arranged in circumferentially spaced relation thereon and disposed in a plane normal to the axis of said shaft, power means connected to said shaft for imparting uninterrupted rotation thereto, machining means mounted for oscillation on said shaft and disposed adjacent to said member, means for coupling said machining means to said member for coincident movement therewith, means for causing said machining means to execute a predetermined machining operation on a work piece held in one of said devices, means connected for coincident movement with said machining means effective at the termination of said machining operation to retract the machining means out of the path of the work piece and then uncouple said machining means from said member, and means for moving said machining means reversely to the direction of rotation of said member preparatory to being recoupled to said member for performance of a similar machining operation on a work piece held in the next following of said devices.

16. In a machine tool, a frame structure including spaced bearings, a shaft mounted for rotation in said bearings, a drum fixed to said shaft, power means for imparting uninterrupted rotation to said shaft, a plurality of work holding devices mounted on the periphery of said drum and disposed in circumferentially spaced relation thereon, means for moving said devices to and from work piece gripping position, machining means comprising a support mounted for oscillation on said shaft and disposed adjacent to said drum and a pair of machining units; each including a rotatable spindle and a tool carried thereby, a motor and means connecting the motor to the spindle for rotating the spindle mounted on said support, said spindles being so disposed angularly with respect to the axis of oscillation of said support as to be opposite the points of engagement with work pieces held in adjacent ones of said work holding devices, means for interlocking said support and machining units to said drum for coincident movement with said machining units positioned one each for engagement with one each of the work pieces held in two adjacent work holding devices, means initiated by said interlocking means for causing said machining units to perform predetermined machining operations on the respective work pieces simultaneously, means for simultaneously stopping the operations of said units at a predetermined extent, means for simultaneously moving said spindles and the tools carried thereby bodily away from the work pieces, means connected to one of said spindles for releasing said interlocking means at the completion of said bodily movement of said spindles and tools, and means for moving said support and machining units reversely to the direction of rotation of said drum for similar interlocking engagement with said drum at the next following one of said work holding devices whereby the machining unit in advance with respect to the direction of rotation of said drum will operate on a newly presented work piece and the other of said units will operate on the work piece first operated on by said unit disposed in advance of the other.

17. In a machine tool, a frame structure including spaced bearings, a shaft mounted in said bearings, power means for imparting uninterrupted rotation to said shaft, a drum fixed to said shaft, work holding means comprising a plurality of work holding devices mounted in predetermined spaced relation about the periphery of said drum and means for opening and closing said devices as they pass predetermined points with reference to said frame structure, machining means comprising a support mounted for oscillation on said shaft and disposed adjacent to said drum and a pair of machining units mounted on said support and positioned for machining contact with different portions of a work piece held in one of said devices; each of said machining units comprising a rotatable spindle and a tool carried thereby, a motor and means connecting the motor to the spindle for rotating the spindle, means for interlocking said machining means to said drum for coincident movement therewith with the tools carried by said spindles positioned opposite the points on the work piece to be engaged thereby, means effective upon initiation of said interlocking to cause said machining units simultaneously to perform predetermined operations on the work piece, means connected to the spindle of one of said units effective to stop operations by both of said units after the operation of said one unit has progressed to a predetermined extent, means operative upon said stopping of machining operations to cause said spindles to move the tools carried thereby bodily away from the work piece, means operative at the completion of said bodily movement of said spindles and tools to release said interlocking means, and means for moving said support and machining units reversely to the direction of rotation of said drum for similar interlocking engagement with said drum in corresponding relation to the next following one of said work holding devices.

18. In a machine tool, a frame structure including spaced bearings, a shaft mounted in said bearings, power means for imparting uninterrupted rotation to said shaft, a drum fixed to said shaft, work holding means comprising a plurality of devices mounted on said drum and disposed in circumferentially spaced relation about the periphery of said drum, means for opening and closing said devices as they pass predetermined points with reference to said frame structure, machining means comprising a support mounted for oscillation on said shaft and disposed adjacent to said drum and a pair of machining units mounted on said support and disposed to engage one each of a pair of work pieces held in adjacent work holding devices; each of said machining units including a rotatable spindle and a tool carried thereby, a motor, and means connecting the motor to the spindle for rotating the spindle, means for interlocking said machining means to said drum for coincident movement therewith with the tools carried by said spindles positioned for engagement with the work pieces carried by adjacent work holding devices, means effective upon initiation of said interlocking to cause said machining units to perform predetermined machining operations simultaneously on the respective work pieces held in said adjacent devices, means connected for coincident movement with the spindle of one of said units effective at the completion of the operation performed thereby to stop both of said units and to cause said spindles and tools to be moved out of the path traversed by the work pieces, means operated by said one of said machining units to release said interlocking means, and means for moving said machining means about said axis reversely to the direction of rotation of said drum for similar interlocking engagement with said drum at a point thereon at which the machining unit in advance of the other with respect to rotation of said drum will engage a newly presented work piece held in the next following of said devices and the other of said machining units will engage and operate on the work piece previously engaged by the machining unit disposed in advance thereof.

19. In a machine tool, a frame structure including spaced bearings, a shaft mounted in said bearings, power means for imparting uninterrupted rotation to said shaft, a drum fixed to said shaft, a plurality of work holding devices mounted in predetermined spaced circumferential relation on said drum, means for maintaining said work holding devices closed during their excursion between predetermined points in each revolution of said drum, other means for holding said devices open during the remainder of each revolution of said drum, machining means mounted for oscillation on said shaft and disposed adjacent to said drum; said machining means including a rotatable tool carrying spindle, a driving motor for rotating said spindle and means for moving said spindle endwise to bring the tool carried thereby into and out of contact with work pieces held in said work holding devices, means for coupling said machining means to said drum for coincident movement therewith, means initiated by said coupling means for simultaneously causing said motor to rotate said spindle and to move said spindle endwise toward a work piece held in one of said devices with resultant performance of a predetermined machining operation on the work piece, means connected to said spindle for movement coincident with said endwise movement for limiting the extent of said machining operation, means effective on activation of said operation limiting means to move said spindle endwise away from the work piece with resultant removal of the tool from contact with the work piece, means operated by said last named endwise movement of said spindle to uncouple said machining means from said drum, and stored power means energized by said coincident movement of said machining means operable upon the uncoupling of said machining means from said drum to move said machining means reversely to the direction of rotation of said drum preparatory for the re-coupling thereof to said drum for a similar machining operation on a work piece held in the next following of said work holding devices.

20. In a machine tool, a frame structure including spaced bearings, a shaft mounted in said bearings, power means for imparting uninterrupted rotation to said shaft, a drum fixed to said shaft, a plurality of releasable work piece gripping devices mounted in predetermined circumferentially spaced relation on said drum, machining means comprising a support mounted for oscillation on said shaft and disposed adjacent to said drum, a machining unit including a tool carrying spindle mounted for rotation and endwise movement on said support, a motor connected to said spindle for imparting rotation thereto mounted on said support and a fluid pressure actuated means connected to said spindle for imparting endwise movements in opposite directions, latch means for coupling said machining means to said drum for coincident movement therewith when the tool carried by said spindle is opposite the point on a work piece held in one of said devices to be engaged thereby, means initiated by movement of said latch means to effect said coupling effective to start said motor with resultant rotation of said spindle and tool and simultaneously activate said fluid pressure actuated means to move said spindle and the tool carried thereby endwise to perform a predetermined operation on the work piece, means actuated by said endwise movement of said spindle to a predetermined extent to stop said motor and to reverse the action of said fluid pressure actuated means with resultant retraction of said spindle and tool out of the path traversed by the work piece, means actuated by said retraction of said spindle to withdraw said latch means with resultant uncoupling of said machining means from said drum, other means operated by withdrawal of said latch means effective to render said fluid pressure means inoperative, and stored power means connected to said frame structure and said machining means energized by said coincident movement effective upon said uncoupling of said machining means to move said machining means in a direction opposed to the direction of rotation of said drum preparatory to the re-coupling of said machining means to said drum in similar relation to the work piece held in the next following work holding device.

21. In a machine tool, a frame structure, a drum rotatably mounted on said frame structure, driving means connected and effective to constantly rotate said drum, a plurality of circumferentially spaced work holding devices mounted on the periphery of said drum; each of said devices including means for releasably gripping a work piece, means for maintaining said work piece gripping devices in gripping position during the excursion thereof through one segment of the path of revolution of said drum, other means effective to maintain said gripping devices in workpiece releasing position during the remainder of the excursion thereof through a revolution of said drum, means for simultaneously performing a plurality of operations on a work piece held in one of said gripping devices comprising a support mounted for oscillation about the axis of rotation of said drum and at least two work performing mechanisms mounted on said support in positions opposite the points on the work piece to be operated on thereby, and devices effective to cause said mechanisms to operate in a cycle with respect to each work piece comprising moving a tool from a point out of the path of travel of the work pieces into work performing engagement with a work piece and upon completion of the work to return to said point, means for latchingly interconnecting said drum and said support for coincident rotation with a work piece aligned with the tools of said mechanisms and for simultaneously initiating the work performing cycles thereof, other means actuated by the retraction of the tool of one of said mechanisms to said point effective to disconnect said support from said drum, means operative upon such disconnection effective to move said support reversely about said axis, and releasable means for terminating said reverse movement at a fixed point relative to said frame.

22. In a machine tool, a frame structure, a drum rotatably mounted on said frame structure, driving means connected to and effective to constantly rotate said drum, a plurality of circumferentially spaced work holding devices mounted on the periphery of said drum; each of said devices including means for releasably gripping a work piece, means for maintaining said gripping devices in gripping position during the excursion thereof through one segment of the path of revolution of said drum, other means effective to maintain said gripping devices in work piece releasing position through the remainder of the excursion thereof through one revolution of said drum, means for simultaneously performing operations on at least a pair of work pieces held in adjacent ones of said gripping devices comprising a support mounted for oscillation about the axis of rotation of said drum and at least two work performing mechanisms mounted on said support and disposed in work performing alignment with the points on the respective work pieces to be acted on thereby, and devices effective to cause said mechanisms to operate in simultaneous cycles with respect to the work pieces comprising moving a tool from a point out of the path of travel of the work pieces into work performing engagement with the respective work pieces and upon completion of the work to return to said point, means for latchingly interconnecting said drum and said support for coincident rotation with the tools of said mechanism aligned with the respective work pieces and for simultaneously initiating the work performing cycles thereof, other means actuated by the retraction of the tool of one of said mechanisms to said point effective to disconnect said support from said drum, means operative upon said disconnection effective to move said support reversely about said axis, and releasable means for terminating said reverse movement at a fixed point relative to said frame.

References Cited in the file of this patent

UNITED STATES PATENTS

| 2,028,225 | Larson | Jan. 21, 1936 |
| 2,165,774 | White | July 11, 1939 |